United States Patent [19]

Tillotson

[11] Patent Number: 4,743,330

[45] Date of Patent: May 10, 1988

[54] METHOD AND APPARATUS FOR COATING AND BONDING A SECONDARY CARPET BACKING

[76] Inventor: John G. Tillotson, 1300 Tiarco Dr., Dalton, Ga. 30720

[21] Appl. No.: 14,699

[22] Filed: Feb. 13, 1987

Related U.S. Application Data

[63] Continuation-in-part of Ser. No. 729,698, May 2, 1985, Pat. No. 4,661,380.

[51] Int. Cl.⁴ ........................ B32B 31/08; B32B 31/12

[52] U.S. Cl. .................................... 156/324; 118/245; 156/72; 156/578; 427/207.1; 427/428; 428/95; 428/96

[58] Field of Search ......................... 156/72, 324, 578; 118/245; 427/207.1, 356, 428; 428/95, 96

[56] References Cited

U.S. PATENT DOCUMENTS

| | | | |
|---|---|---|---|
| 2,534,321 | 12/1950 | Taylor | 427/356 X |
| 3,302,610 | 2/1967 | Mahoney | 427/428 X |
| 3,511,696 | 5/1970 | Murray | 427/428 |
| 3,533,833 | 10/1970 | Takahashi et al. | 427/428 X |
| 3,539,384 | 11/1970 | Kolesinskas | 427/428 |
| 4,156,524 | 5/1979 | Bar-on et al. | 118/245 X |
| 4,267,215 | 5/1981 | Riggs | 427/428 X |
| 4,379,730 | 4/1983 | Anderson et al. | 156/324 |
| 4,632,850 | 12/1986 | Tillotson | 427/356 |

*Primary Examiner*—Robert A. Dawson

*Attorney, Agent, or Firm*—Jones, Askew & Lunsford

[57] ABSTRACT

An improved method and apparatus for applying adhesive to a backing fabric, such as for adhesively laminating a secondary fabric backing to a carpet. The adhesive is formed into a layer of predetermined thickness on the surface of a rotating casting roller, and the backing fabric is conveyed along a path adjacent to the casting roller in a direction opposite to the direction of rotation of the casting roller. A press blade brings sucessive portions of the backing fabric into contact with a portion of the casting roller, and the adhesive layer on the casting roller is transferred to the backing fabric at an adhesive contact point. The backing fabric is then conveyed abruptly away from the casting roller at the adhesive contact point in a substantially radial direction. This abrupt lateral disengagement of the backing fabric from the casting roller prevents the backing fabric from being dragged through the oncoming layer of adhesive on the casting roller, and further prevents the cohesive interaction between the layer of adhesive on the casting roller and the deposited layer of adhesive on the back of the backing fabric which can pull adhesive off the backing fabric back onto the casting roller or vice-verse.

15 Claims, 2 Drawing Sheets

METHOD AND APPARATUS FOR COATING AND BONDING A SECONDARY CARPET BACKING

CROSS-REFERENCES TO RELATED APPLICATIONS

This application is a continuation-in-part of application Ser. No. 729,698, filed May 2, 1985, and now U.S. Pat. No. 4,661,386.

TECHNICAL FIELD

The present invention relates generally to the construction of laminated carpet fabrics, and more particularly relates to an improved system and method for applying adhesive to a secondary backing fabric for adhesively laminating the secondary backing to a carpet.

BACKGROUND OF THE INVENTION

Laminated carpet fabrics comprising a carpet and a secondary backing fabric affixed to the carpet by an adhesive are known in the art. Numerous adhesives and methods of applying adhesive to fabrics for the purpose of laminating adhesively coated fabrics to other pieces of fabric are also well known.

Typically, an adhesive is applied to a carpet to bond the tufts to the primary backing and to bond the carpet with a secondary backing material to form a laminated structure. After application of the adhesive, the carpet and secondary backing are brought into intimate contact with each other and then are passed between a pair of laminating rollers. The laminating rollers are configured to cause adhesive on the back of the carpet to be transferred from the carpet to the secondary backing and also to maintain the materials in intimate contact. The laminated structure is then typically treated by suitable means to solidify the adhesive.

The quality of the bond between the carpet and secondary backing and the amount of adhesive required are in part determined by the method chosen for applying the adhesive. Various methods are known to the art and fall into two categories. The first category comprises methods which apply the adhesive to the carpet and transfer it from the carpet to the secondary backing. These methods are wasteful of adhesive, since the valleys and depressions in the back surface of the carpet must be substantially full to transfer sufficient adhesive to the secondary backing.

The secondary category comprises methods for applying adhesive directly to the secondary backing. One method in this category comprises dipping the secondary backing directly into the adhesive, which is again wasteful because it coats surfaces which do not contact the carpet. Another method comprises applying the adhesive to the secondary backing from an adhesive-coated roller. The adhesive is formed into a layer on a rotating casting roller, and the backing fabric being conveyed in the opposite direction to the rotating casting roller is brought into contact with a portion of the casting roller to transfer the adhesive from the casting roller onto the backing fabric. However, as the backing fabric is drawn away from the casting roller, the fabric is dragged through the oncoming layer of adhesive on the casting roller, smearing the adhesive on the fabric backing and causing an uneven coating. Additionally, the high viscosity of the adhesive on the casting roller tends to pull at the adhesive transferred onto the backing fabric, causing some of the adhesive to be pulled off of the fabric backing, or causing additional adhesive to be pulled off the casting roller and onto the backing fabric. Thus, this coated roller method tends to produce a coating on the secondary backing which is so unevenly deposited that an excessive amount of adhesive must be applied to assure adequate lamination strength.

These methods of lamination require the application of relatively large amounts of adhesive to achieve the desired delamination strength of the bond between the carpet and the secondary backing. Such systems are shown in U.S. Pat. Nos. 2,428,358, 3,238,595, 3,567,548, and 3,669,779.

Accordingly, there is a need to provide a method for applying a uniform coating of adhesive to only the surfaces of the secondary backing which are to come in contact with the carpet, while avoiding the coating of non-contacting surfaces and use of excessive adhesive. Further, there is a need to reduce the amount of wasted adhesive while maintaining laminated carpet structures which provide acceptable delamination strength between the carpet and the secondary backing fabric. Prior art processes have not heretofore been able to accomplish these goals with acceptable results.

SUMMARY OF THE INVENTION

The present invention provides an improved method of making a laminated carpet structure and an improved process for applying an adhesive to a secondary backing fabric and for laminating the secondary backing to a carpet. Briefly described, the process comprises conveying an uncoated secondary backing fabric along a predetermined path. An adhesive composition is prepared and deposited on the surface of a casting roller which rotates in a direction opposite to the direction of movement of the secondary backing fabric along the path. The deposited adhesive, which forms a "puddle" on the top of the rotating casting roller, is then passed under doctoring means spaced a predetermined distance above the surface of the casting roller to doctor the adhesive into a thin layer having a predetermined thickness. The secondary backing fabric is then passed between the rotating casting roller and a press blade positioned subsequent to the doctoring means, to press the secondary backing fabric against the counterrotating casting roller to transfer the doctored layer of adhesive onto the secondary backing fabric. Immediately upon contact with the adhesive, the backing fabric is conveyed sharply away from the roller in a substantially radial direction. This sharp lateral disengagement prevents the backing fabric from being dragged through the oncoming layer of adhesive on the casting roller, and also prevents the highly viscous adhesive from being pulled off the backing fabric back onto the casting roller, or off the casting roller onto the backing fabric. The resulting coating of adhesive on the secondary backing fabric is a smooth and even coating of the surfaces of the backing fabric which are to come in contact with the carpet, while avoiding the wasteful coating of non-contacting surfaces.

Thereafter, the coated surface of the secondary backing fabric is brought into intimate contact with a precoated back surface of a carpet to form a laminated carpet structure. Preferably, the laminated carpet structure is then compressed to promote the adhesion between the carpet and the secondary backing fabric, preferably by passing the laminated structure through at least one pair of opposed press rollers. Finally, the laminated structure is treated by suitable means to solidify the adhesive, with additional optional compression by opposed press rollers used during the solidification treatment to further promote the bonding of the adhesive.

The result of the preferred method is an improved carpet structure having high delamination strength, with improved cost effectiveness due to the reduced amount of adhesive used to bond the secondary backing to the carpet.

Accordingly, it is an object of the present invention to provide an improved method of laminating carpet and secondary backing fabrics.

It is another object of this invention to provide a method of laminating carpet and secondary backing fabrics which requires less adhesive than conventional methods while maintaining acceptable delamination strength.

It is another object of the present invention to provide an improved method for applying an adhesive composition to a secondary backing fabric in preparation for the bonding of the secondary backing fabric to a carpet.

It is yet another object of this invention to provide a method for applying a uniform coating of adhesive only on the surfaces of a secondary backing fabric which are to come into contact with the back surface of a carpet while avoiding the coating of non-contacting surfaces.

Other objects, features, and advantages of the present invention will become apparent upon reading the following specification when taken in conjunction with the drawing and the appended claims.

DETAILED DESCRIPTION OF THE INVENTION

Figure 1:
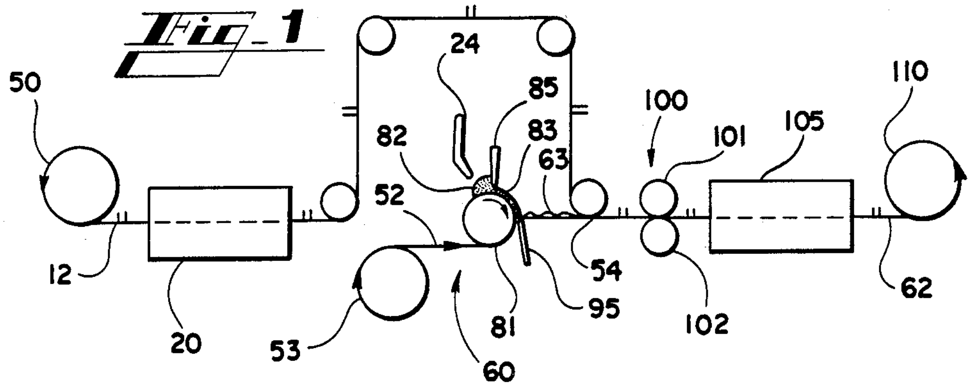
FIG. 1 is a schematic diagram of the preferred method and apparatus for applying an adhesive to a secondary backing fabric, and for joining the coated secondary backing and a precoated carpet, according to a preferred embodiment of the invention.

Referring now in more detail to the drawing, in which like numerals indicate like elements throughout the several views, FIG. 1 schematic representation of a method and apparatus for applying a coat of adhesive to a secondary backing fabric and for laminating the coated secondary backing to a precoated carpet according to the present invention. A carpet 12 from a supply roll 50 is adhesively precoated by an anchor coat applicator 20 and conveyed to a combining roll 54. A secondary backing fabric 52 from a supply roll 53 is conveyed along a path through an adhesive coating station 60, which comprises a casting roller 81 rotating in a direction opposite to the direction of movement of the secondary backing. A traversing dispenser 24 is disposed to apply a puddle 82 of adhesive mixture onto the top or upper surface of the casting roller 81. A doctor blade 85 is spaced a predetermined distance from the upper surface of the casting roller 81 to doctor the puddle 82 of adhesive into a layer 83 of predetermined thicknes on the rotating casting roller.

Figure 2:
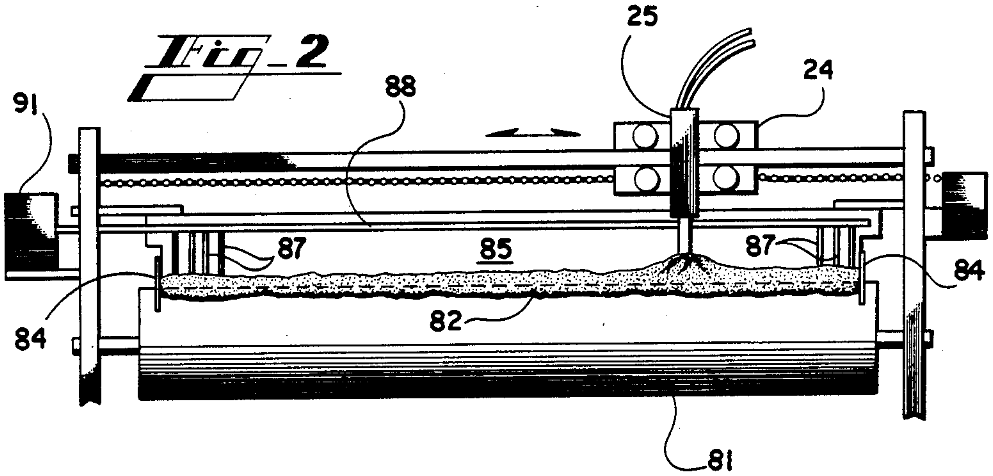
FIG. 2 is a partial detailed front elevational view of a doctor blade, agitation fingers, and ultra-high viscosity traversing dispenser employed in the preferred embodiment.

As shown in FIG. 2, guards or dams 84 mounted near the ends of the casting roller 81 confine the puddle 82 and prevent the adhesive from flowing off the ends of the casting roller. A highly viscous adhesive may adhere to the doctor blade 85 to a degree which may interrupt the flow of adhesive through the opening between the doctor blade and the casting roll 81. To ensure an uninterrupted flow, a plurality of elongate wiper fingers 87 are mounted to extend into the puddle 82 substantially parallel and adjacent to the doctor blade 85. The wiper fingers 87 are mounted on a mounting bar 88 which is oscillated by an oscillating motor 91 to cause the wiper fingers to reciprocate while being held parallel to and closely against the doctor blade 85.

In the preferred embodiment, the distance between the doctor blade 85 and the surface of the casting roller 81 is set at about 0.017". In order to ensure an even coating on the secondary backing, variance in the diameter of the casting roller should preferably be maintained within a tolerance of about 5 percent of the gap between the doctor blade and the casting roller. Preferably, then, the diameter of the casting roller should not vary more than about 0.001" for best results.

The doctor blade 85 is mounted to a pivotable mounting bar which allows the doctor blade to pivot away from the surface of the casting roller 81 to open the gap between the doctor blade and the casting roller. Thus, the doctor blade 85 can be purged at periodic intervals to allow the escape of accumulations of debris or lumps in the adhesive and to minimize streaking in the applied layer of adhesive. Preferably, the doctor blade is mounted so that the blade can be moved about 0.035" away from the casting roll 81 at periodic intervals of about 5 to about 20 seconds. More or less frequent purging may be required, depending upon the parameters of the adhesive.

After the adhesive composition has been applied in a thin layer 83 to the casting roller 81, successive portions of the secondary backing fabric 52 are brought into contact with a portion of the rotating casting roller to transfer the coated layer 83 of adhesive onto the secondary backing. The preferred method for transferring the doctored layer of adhesive from the casting roller to the secondary backing is to pass the secondary backing between the counterrotating casting roller 81 and a flexible spring steel press blade 95 positioned to press the secondary backing against the rotating casting roller. This causes the deposited doctored layer 83 of adhesive to be transferred onto the secondary backing while allowing seams or slubs or other unduly thick areas of the secondary backing to pass through the opening between the flexible press blade 95 and the casting roller 81 without excessive interference which might otherwise damage the secondary backing.

Figure 5:
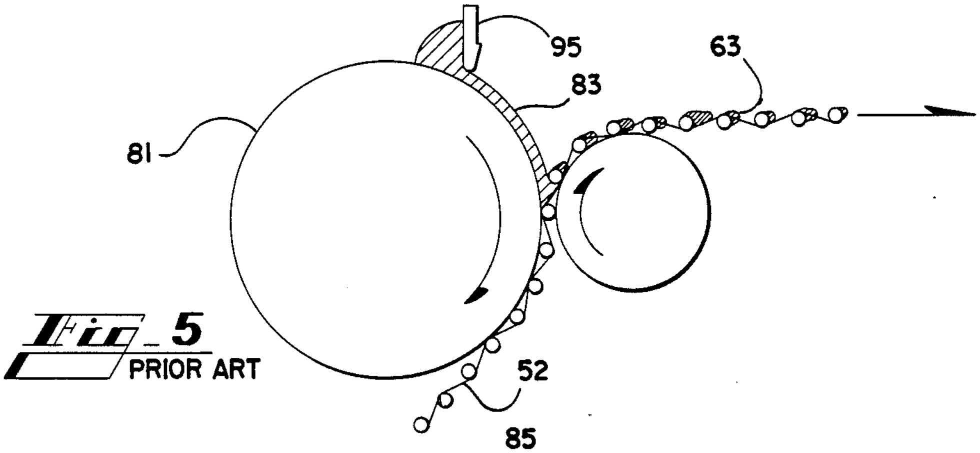
FIG 5 PRIOR ART

Damaging interference might also be avoided by replacing the press blade with a press roller, as shown in FIG. 5, having a surface speed and direction synchronous with the motion of the secondary backing. However, the use of a flexible press blade not only eliminates the need to move the pressing surface synchronously with the secondary backing fabric but also makes it possible to cause the secondary backing fabric to follow an arc-shaped path of very small radius during the withdrawal of the secondary backing fabric from the adhesive layer.

Subsequent to the transfer of the adhesive onto the secondary backing, the coated surface of the secondary backing 52 is brought into contact with the back surface of the precoated carpet 12 at a combining roller 54 to form the laminated carpet structure 62.

Subsequent to the combining roller 54, the disclosed embodiment employs a compression station 100 comprising a pair of opposed press rollers 101, 102, which compress the laminated structure 62 to promote the adhesion between the tufted primary backing 12 and the secondary backing 52.

When the carpet 12 and the secondary backing 52 are compressed by the laminating rollers 101, 102, the adhesive therebetween may have a tendency to be squeezed through the layer of secondary backing onto the lower laminating roller 102, which can result in an undersirable buildup of adhesive on the roller. To avoid this problem, the lower laminating roller 102 is preferably driven at a rate which will provide a roller surface speed different from the linear speed of the laminated carpet structure 62, i.e. a speed either greater than or less than the speed of the laminated carpet structure.

After the compression station 100, the laminated carpet structure 62 may then be treated by suitable means 105 to solidify the adhesive compositions. Additionally, the laminated structure can be compressed by press rollers during the solidification treatment (not illustrated) to further promote adhesion and to further solidify the adhesive compositions. The completed laminated carpet structure 62 may then be wound on a take-up roll 110.

Figure 3:
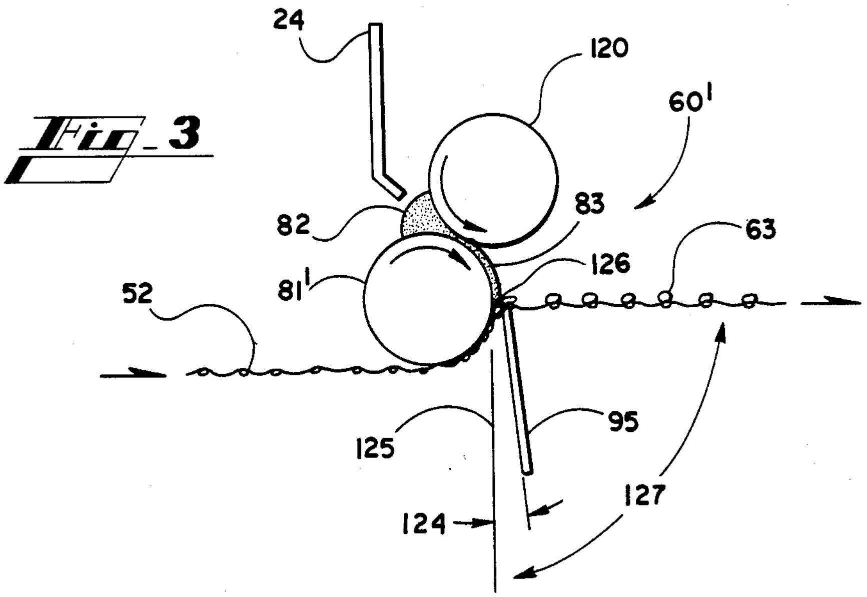
FIG. 3 is a schematic view of an alternate method and apparatus for doctoring a layer of adhesive into a uniform layer of predetermined thickness onto a casting roller for application to a secondary backing fabric.

FIG. 3 illustrates an alternate method of applying a layer of adhesive to the secondary backing. This alternate method comprises conveying the secondary backing 52 through adhesive coating station 160 comprising casting roller 81 and a doctor roller 120 spaced a predetermined distance from the upper surface of the casting roller and rotating in the opposite direction from the casting roller. Traversing dispenser 24 deposits a puddle 82 of adhesive onto the upper surface of the casting roller where the doctor roller 120 meters the adhesive into layer 83 of predetermined thickness on the casting roller. Large particles in the adhesive composition are disintegrated as the adhesive passes between the rollers to ensure an uninterrupted flow of adhesive and a smooth continuous layer 83.

In the alternate embodiment of FIG. 3, the doctor roller 120 must rotate slowly enough so that most of the adhesive is deposited on the casting roller 81 in a continuous layer. The desired speed of the doctor roller is less than ½, preferably about 1/10 to about 1/20, the speed of the casting roller. The rotational speed of the casting roller and the distance separating the rollers are controlled so that a predetermined amount of adhesive is placed on the contacting surface of the secondary backing. The preferred speed of the casting roller is from about ¼ to about 2 times the speed of the secondary backing, and the preferred opening between the rollers is from about 0.010″ to about 0.040″.

The opening between the flexible spring steel press blade 95 and the casting roller 81 is controlled so that the secondary backing 52 is pressed closely to the casting roller without risking damage to the secondary backing. The opening may be varied according to the thickness of the secondary backing, and it is preferred to use an opening of from about 0.020″ less than to about 0.020″ more than the thickness of the secondary backing.

Referring again to FIG. 3 for purposes of illustration, the angle 124 formed between the press blade 95 and a tangent 125 to the casting roller 81 at the adhesive contact point 126 is controlled between about 0° and about 90°, preferably between about 5° and about 25°. The arc described by the path of the secondary backing while it is in contact with the press blade has a radius of between 0.005 inches and 0.5 inches, preferably between 0.01 inches and 0.05 inches.

Figure 4:
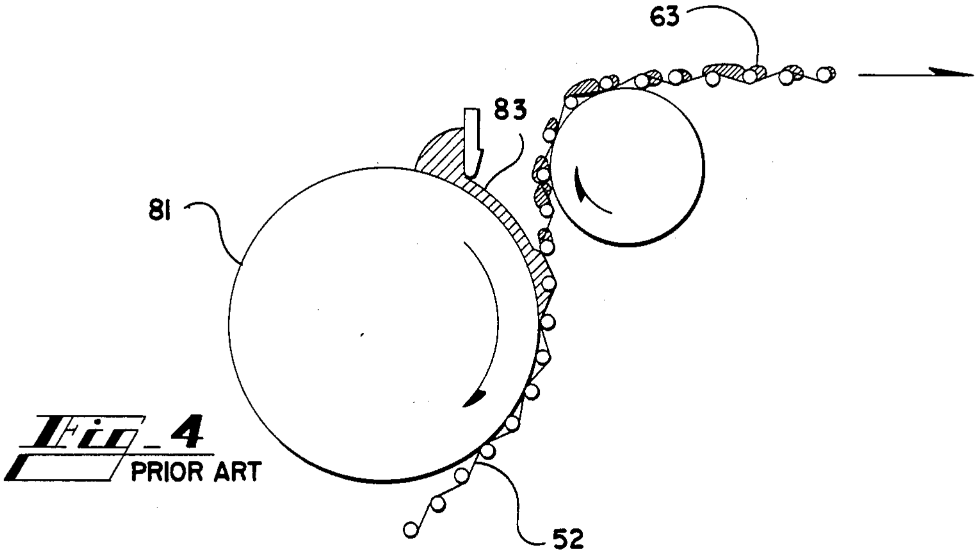
FIG 4 PRIOR ART
FIGS. 4 and 5 illustrate prior art methods of applying an adhesive from a casting roller to a secondary backing fabric.

An important feature of the present invention concerns the movement of the backing fabric at the contact point between the adhesive layer on the casting roller and the backing fabric. FIGS. 4 and 5 illustrate the prior art methods referred to above for coating a secondary backing fabric, whereby the secondary backing is conveyed along a predetermined path to be brought into contact with a roller which has been coated with an adhesive layer of predetermined thickness. The roller is rotated in a direction opposite to the path of the secondary backing. The secondary backing is wiped against the adhesive film on the roller and then conveyed away from the roller along a path which is either tangential to the casting roller at the point of departure as shown in FIG. 4, or arc-shaped as shown in FIG. 5. Thus, as the backing fabric is conveyed away from the casting roller, the backing fabric is dragged through the oncoming layer of adhesive on the casting roller, smearing the adhesive onto non-carpet-contacting surfaces of the backing fabric. In addition, as the backing fabric is gradually withdrawn away from the casting roller, the cohesiveness of the preferred adhesives can cause some of the deposited adhesive film to be pulled away from the secondary backing and back onto the casting roller, or can cause adhesive to be pulled off of the casting roller and onto the back of the backing fabric. The resulting adhesive coating on the secondary backing fabric is so unevenly deposited that adequate lamination strength cannot be achieved unless an excessive amount of adhesive is applied before the secondary backing is laminated to the carpet.

Figure 6:
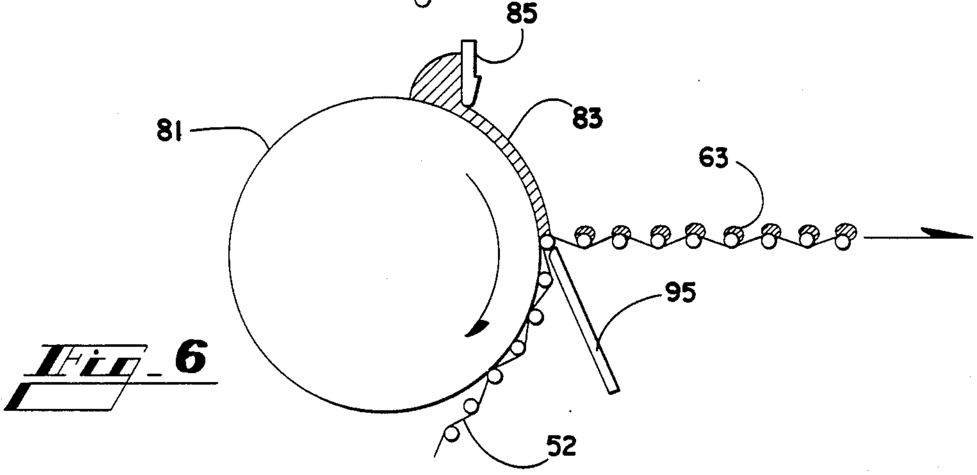
FIG. 6 is a schematic diagram of the casting roller of the method and apparatus of FIG. 1.

In contrast, FIG. 6 shows the method and apparatus for transferring an adhesive layer 83 onto a secondary backing fabric 52, according to the present invention. The secondary backing fabric 52 is conveyed along a predetermined path and brought into contact with a portion of the adhesive-coated roller 81, which is rotating in a direction opposite to the direction of the secondary backing fabric. A press blade 95 presses the backing fabric 52 against a portion of the casting roller 81, causing adhesive to be transferred onto the back of the backing fabric at an adhesive contact point 126. From that adhesive contact point 126, the backing, fabric is conveyed sharply laterally away from the casting roller 81 along a substantially radial path. By obliquely withdrawing the backing fabric from the casting roller, rather than gradually withdrawing the fabric along a tangential or gradually arcing path, the fabric is not dragged through the oncoming adhesive layer 83 on the casting roller 81. Thus, only the topmost back surfaces of the backing fabric, the surfaces which will contact the carpet, are coated with adhesive. Further, since the backing fabric 52 is sharply disengaged from the adhesive layer 83 on the casting roller 81, there is no opportunity for the cohesiveness of the adhesive to pull additional adhesive from the casting roller onto the backing fabric, or to pull deposited adhesive away from the backing fabric back onto the casting roller. The resulting deposited layer of adhesive on the back of the fabric backing is thus smooth and even, and the wasteful coating of non-carpet-contacting surfaces is avoided. With this method, it is thus possible to apply regular and uniform but discontinuous deposits of adhesive to only the high spots on the surface of the secondary backing fabric. Thus, the adhesive is applied most advantageously for contacting the carpet, thereby producing a superior bond while using a minimum amount of adhesive.

While the preferred embodiment is disclosed with respect to a method and apparatus wherein the fabric backing is conveyed away from the roller along a substantially radial path, it will be appreciated that other paths comprising an abrupt discontinuous departure from the adhesive contact point 126 will yield preferred results over the tangential or broadly arcing paths of the prior art apparatus shown in FIGS. 4 and 5. Any path of departure from the adhesive contact point which is nontangential will cause the backing fabric to be dragged through the oncoming layer of adhesive on the casting roller for a shorter distance than a tangential path. However, as the angle between the path of the backing fabric and a tangent to the casting roller is increased toward 90°, superior results are achieved, both in terms of minimizing the distance by which the backing fabric is dragged through the layer of adhesive, and in terms of minimizing the cohesive interaction between the layer of adhesive on the casting roller and the deposited adhesive on the back of the backing fabric. However, as the angle further increases, an additional factor comes into play, namely, the friction between the backing fabric and the press blade as the backing fabric is wrapped around the end of the blade. Thus, while conveying the backing fabric away from the adhesive contact point on the roller at an angle of 135° with respect to tangent would yield acceptable results with respect to minimizing the dragging of the backing fabric through the layer of adhesive on the casting roller and with respect to minimizing the cohesive interaction between the two adhesive layers, the friction between the backing fabric and the press blade as the backing fabric is wrapped around the end of the press blade would require great force to overcome and would potentially damage the backing fabric. Thus, a path of from about 45° to about 105° with respect to tangent will minimize the smearing of the adhesive on the back of the backing fabric while also providing an acceptable level of friction between the backing fabric and the press blade.

It has been found that the preferred adhesive for bonding a secondary backing fabric to a carpet is carboxylated SBR latex. Other acceptable adhesives include natural rubber latex, styrene/butadiene latex, ethylene vinyl acetate latex, acrylic latex, polyurethane elastomers, polyurethane foams, polyvinyl chloride plastisols, and hot melt resins.

Finally, it will be understood that the preferred embodiment of the present invention has bee disclosed by way of example, and that other modifications may occur to those skilled in the art without departing from the scope and spirit of the appended claims.

What is claimed is:

1. A process for applying a layer of adhesive to a backing fabric, comprising the steps of:

forming said adhesive into a layer on the surface of a rotating roller;

transporting successive portions of said backing fabric against said roller in a direction opposite to the direction of rotation of said roller to transfer said layer of adhesive from said roller to said backing fabric at a contact point; and transporting said backing fabric nontangentially away from said roller at said contact point.

2. The process of claim 1, wherein said step of transporting said backing fabric nontangentially away from said roller at said contact point comprises transporting said backing fabric away from said contact point along a path which is substantially radial with respect to said roller.

3. The process of claim 1, wherein said step of transporting successive portions of said backing fabric against said roller in a direction opposite to the direction of rotation of said roller comprises the steps of:

transporting said backing fabric along a path adjacent to said roller in a direction opposite to said direction of rotation of said roller; and pressing said backing fabric against a portion of said rotating roller with a press blade.

4. A process for forming a carpet product having a tufted primary backing fabric and a secondary backing fabric laminated to the back thereof, comprising the steps of:

forming an adhesive into a layer on the surface of a rotating roller;

transporting successive portions of said secondary backing fabric against said roller in a direction opposite to the direction of rotation of said roller to transfer said layer of adhesive from said roller to a first surface of said secondary backing fabric at a contact point;

transporting said backing fabric nontangentially away from said roller at said contact point; and bringing the adhesive-coated first surface of said secondary backing fabric into intimate contact with the back of said tufted primary backing fabric to form a laminated carpet product.

5. The process of claim 4, wherein said step of transporting said backing fabric nontangentially away from said roller at said contact point comprises transporting said backing fabric away from said contact point along a path which is substantially radial with respect to said roller.

6. The process of claim 4, wherein said step of transporting successive portions of said backing fabric against said roller in a direction opposite to the direction of rotation of said roller comprises the steps of:

transporting said backing fabric along a path adjacent to said roller in a direction opposite to said direction of rotation of said roller; and pressing said backing fabric against a portion of said rotating roller with a press blade.

7. A method of applying a layer of adhesive to a backing fabric, comprising the steps of:

transporting said backing fabric along a path;

depositing said adhesive onto the upper surface of a roller rotating in a direction opposite to the direction of movement of the backing fabric;

forming said adhesive into a layer on the surface of said roller;

pressing said backing fabric against a portion of said counterrotating roller to transfer said layer of adhesive from said roller to said backing fabric at an adhesive contact point; and transporting said backing fabric laterally away from said roller at said adhesive contact point.

8. An apparatus for applying a layer of adhesive to a backing fabric, comprising:

a rotating roller;

means for forming said adhesive into a layer of controlled thickness on the surface of said rotating roller;

means for transporting said backing fabric along a path adjacent to said rotating roller in a direction opposite to the direction of rotation of said rotating roller;

means for pressing successive portions of said backing fabric against a portion of said rotating roller to transfer said layer of adhesive from said roller to said backing fabric at a transfer point; and means for transporting said backing fabric laterally away from said roller at said transfer point.

9. The apparatus of claim 8, wherein said means for pressing said backing fabric against a portion of said rotating roller comprises a press blade disposed adjacent said transfer point to press said backing fabric against a portion of said rotating roller.

10. The apparatus of claim 9, wherein said means for transporting said backing fabric laterally away from said roller at said transfer point comprises means for sharply bending said backing fabric around the end of said press blade to laterally disengage said backing fabric from said roller.

11. The apparatus of claim 8, wherein said means for transporting said backing fabric laterally away from said roller at said transfer point comprises means for transporting said backing fabric away from said transfer point along a path discontinuous to the path of the backing fabric as it is pressed against said roller so that the backing material moves nontangentially away from said roller.

12. An apparatus for manufacturing a carpet product having a tufted primary backing fabric and a secondary backing fabric laminated to the back of said primary backing fabric, comprising:

a rotating roller;

means for forming an adhesive into a layer of controlled thickness on the surface of said rotating roller;

means for transporting said secondary backing fabric along a path adjacent to said rotating roller in a direction opposite to the direction of rotation of said rotating roller;

means for pressing successive portions of said secondary backing fabric against a portion of said rotating roller to transfer said layer of adhesive from said roller to a first surface of said secondary backing fabric at a transfer point;

means for transporting said secondary backing fabric nontangentially away from said roller at said transfer point; and means for intimately contacting said adhesive-coated first surface of said secondary backing fabric with the back of said tufted primary fabric backing to form a laminated carpet product.

13. The apparatus of claim 12, wherein said means for pressing said backing fabric against a portion of said rotating roller comprises a press blade disposed adjacent said transfer point to press said backing fabric against a portion of said rotating roller.

14. The apparatus of claim 13, wherein said means for transporting said backing fabric nontangentially away from said roller at said transfer point comprises means for bending said backing fabric around said press blade to shearingly disengage said backing fabric from said roller.

15. The apparatus of claim 12, wherein said means for transporting said backing fabric nontangentially away from said roller at said transfer point comprises means for transporting said backing fabric away from said transfer point along a path discontinuous to the path of the backing fabric as it is pressed against said roller such that said backing material moves nontangentially away from said roller.

* * * * *